United States Patent [19]

Inaba et al.

[11] 4,170,574

[45] Oct. 9, 1979

[54] PROCESS FOR PRODUCING OXIDIZING METAL CATALYSTS INCORPORATING PLATINUM AND CATALYST PRODUCED BY THE PROCESS

[75] Inventors: Hideya Inaba; Yasumi Kamino; Shigenori Onizuka; Chikashi Inazumi, all of Osaka, Japan

[73] Assignee: Hitachi Shipbuilding & Engineering Co., Ltd., Osaka, Japana

[21] Appl. No.: 873,692

[22] Filed: Jan. 30, 1978

[30] Foreign Application Priority Data

Sep. 12, 1977 [JP] Japan .................................. 52-110095

[51] Int. Cl.$^2$ ...................... B01J 21/04; B01J 23/42; B01J 23/74
[52] U.S. Cl. .............................. 252/472; 252/466 PT; 252/466 B; 252/470; 252/477 Q; 423/213.5
[58] Field of Search ......... 252/466 PT, 466 B, 477 Q, 252/472; 423/213.5, 239 A

[56] References Cited

U.S. PATENT DOCUMENTS

| 3,712,856 | 1/1973 | Betz ................................ 252/477 Q |
| 4,040,981 | 8/1977 | Inaba et al. ....................... 252/466 J |
| 4,076,792 | 2/1978 | Foster et al. ................... 252/466 PT |

*Primary Examiner*—W. J. Shine
*Attorney, Agent, or Firm*—Armstrong, Nikaido, Marmelstein & Kubovcik

[57] ABSTRACT

An oxidizing metal catalyst incorporating platinum is produced by converting the surface layer of steel material of specified shape resembling a ring, honeycomb, plate or the like to an aluminum alloy, treating the steel material with an aluminum dissolving solution to dissolve out the aluminum and to render the surface layer porous, subjecting the steel material to oxidation treatment to obtain a catalyst carrier, immersing the carrier in a solution of chloroplatinic acid adjusted to weak alkalinity with sodium hydroxide, and drying the carrier after withdrawing the carrier from the solution.

10 Claims, 3 Drawing Figures

PROCESS FOR PRODUCING OXIDIZING METAL CATALYSTS INCORPORATING PLATINUM AND CATALYST PRODUCED BY THE PROCESS

BACKGROUND OF THE INVENTION

This invention relates to oxidizing metal catalysts incorporating platinum for oxidizing ammonia, carbon monoxide and like air pollutants contained in various exhaust gases to render the pollutants harmless.

The activity and life of catalysts are significant factors in catalytic reactions. Additionally the pressure loss attributable to the configuration of catalysts poses a serious problem. When large quantities of gases are treated especially as is the case with the treatment of exhaust gases, marked pressures losses, if involved, will lead to an increased power consumption for blowers and other devices, resulting in an increased operating cost. To overcome the problem of such pressure losses, honeycomb-shaped carriers of ceramics have been developed and introduced into use in place of conventional granular carriers. However, ceramics carriers, which are of poor strength and fragile, are not suited to the treatment of large quantities of gases such as exhaust gases. To overcome the problems described above, we have carried out intensive research in an attempt to provide oxidizing catalysts having outstanding strength and usable without entailing pressure losses. Our efforts have matured to the development of catalysts which are produced by converting the surface layer of steel material of specified shape resembling a ring, honeycomb, plate or the like to an aluminum alloy, treating the steel material with an aluminum dissolving solution to dissolve out the aluminum and to render the surface layer porous, subjecting the steel material to oxidation treatment to obtain a catalyst carrier, and causing the carrier to support platinum by immersing the carrier in a solution of a platinum compound. In the final step of this process, it is most suitable to use an aqueous solution of chloroplatinic acid.

In the process described above, the aqueous solution of chloroplatinic acid penetrates into the pores of the carrier, thereby permitting the platinum to be supported by the carrier. Thus the adsorption of platinum by the carrier hardly takes place. Consequently, the amount of the solution gradually reduces with the repetition of the immersion treatment, but the platinum concentration of the solution remains unchanged. The treating bath may therefore be replenished, from time to time, with a fresh aqueous solution of chloroplatinic acid of the same concentration. However, since the aqueous solution of chloroplatinic acid is acidic, part of the steel carrier will dissolve out into the treating bath in the course of the treatment, giving rise to the necessity of removing the dissolved iron from the bath if it is desired to continually repeat the treatment with use of the same bath while replenishing the bath with a fresh solution. The dissolving out of iron could be prevented by rendering the bath alkaline, but the adjustment of the pH of the bath must then be made without leading to the formation of any precipitate whatever. It is also critical that the catalyst produced with use of the adjusted solution be still as active as desired.

SUMMARY OF THE INVENTION

Our research has revealed that these requirements can be fulfilled advantageously by the use of a specified pH adjusting agent, and based on this finding we have accomplished this invention.

This invention provides a process for producing oxidizing metal catalysts incorporating platinum comprising the first step of converting the surface layer of steel material of specified shape resembling a ring, honeycomb, plate or the like to an aluminum alloy, the second step of treating the steel material with an aluminum dissolving solution to dissolve out the aluminum and to render the surface layer porous, the third step of subjecting the steel material to oxidation treatment to obtain a catalyst carrier, the fourth step of immersing the carrier in a solution of chloroplatinic acid adjusted to weak alkalinity with sodium hydroxide, and the fifth step of drying the carrier after withdrawing the carrier from the solution.

The pH adjusting agent, i.e. sodium hydroxide, does not produce any precipitate whatever in the chloroplatinic acid solution, nor does it exert any adverse effect on the activity of the catalyst obtained.

PREFERRED EMBODIMENTS OF THE INVENTION

Figure 1:
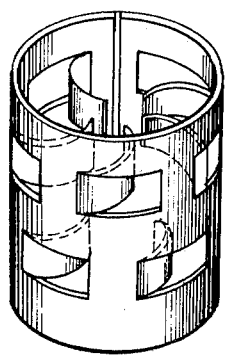
FIG. 1 is a perspective view showing a Paul ring used in the example of this invention.

According to this invention steel materials in the shape of a ring, honeycomb, plate or the like as specified are used because steel materials of such shape have high strength and are therefore unlikely to cause substantial pressure losses when used for the treatment of large quantities of exhaust gases. Examples of useful steel materials are stainless steel, carbon steel, nickel steel, tungsten steel, molybdenum steel, etc. These examples are not limitative; pure iron is of course usable.

In the first step, the surface layer of the steel material is converted to an aluminum alloy usually by coating the steel material with aluminum and heat-treating the aluminum-coated steel material. The steel material can be so coated, for example, by hot dipping, cementation, vacuum evaporation, spray coating or like plating method. The heat treatment is conducted at a temperature of not lower than the melting point (660° C.) of aluminum, preferably at about 800° C., for several minutes to several hours, preferably for about one hour. The heat treatment causes the solid phases of the steel material and aluminum to diffuse through each other, forming an alloy.

In the second step, the aluminum is dissolved out from the steel material having the alloy layer by immersing the steel material in a solution capable of dissolving aluminum or by spraying the aluminum dissolving solution against the alloy layer of the steel material. Examples of useful aluminum dissolving solutions are aqueous acid or alkali solutions. Examples of preferred acids are mineral acids such as hydrochloric acid and nitric acid. Examples of useful alkalis are sodium hydroxide and like alkali metal hydroxides, alkali metal carbonates, alkaline earth metal hydroxides, etc. Aqueous solutions of alkali metal hydroxides are especially preferable. The temperature of the aluminum dissolving solutions, although not particularly limited, is preferably room temperature to 100° C. The dissolving out of the aluminum from the steel material renders its surface layer porous. The steel material having the resulting porous surface layer is washed with water and dried in the usual manner.

In the third step, the steel material is subjected to oxidation treatment under mild conditions, for example, by contacting the porous surface layer with a gas containing 0.1 to 20.8% by volume of oxygen for instance at approximate room temperature to 400° C. for 0.1 to 20 hours. Water, $CO_2$ or $N_2$, if present in the oxidizing atmosphere, will produce little or no influence on the effects achieved by the treatment. In this way, a carrier is produced according to this invention.

In the fourth step, sodium hydroxide is used usually in the form of an aqueous solution. Preferably the aqueous solution has a high concentration, for example, of about 10 moles/liter. The pH values preferred to ensure weak alkalinity are in the range of about 9 to about 10. Preferably the chloroplatinic acid solution has a concentration of 0.01 to 1.0% by weight, calculated as Pt. The preferred immersion time is 10 minutes to one hour. Ammonia water, if used as a pH adjusting agent in place of sodium hydroxide, will produce a suspension even at a pH of 3 to 4, forming a yellow precipitate, hence unusable.

The wet product is then dried in the fifth step at about 100° C. or slightly higher temeratures. The catalyst thus produced contains 0.0001 to 0.1% by weight of Pt.

An example of this invention will be given below. The catalyst prepared was tested for activity in comparison with another catalyst.

EXAMPLE

Paul rings (26 mm in both diameter and length, 0.5 mm in wall thickness, 40 cm$^2$ in geometric surface area) of stainless steel, SUS 316 (JIS), as shown in FIG. 1 were immersed in a molten aluminum bath at 700° C. for 5 minutes, then withdrawn from the bath and thereafter heat-treated in an electric oven at 800° C. for one hour. The rings were cooled, then immersed in 200 ml of 10% NaOH aqueous solution at 80° C. for 3 hours, thereafter withdrawn from the solution and subsequently washed with water treated with ion exchange resin. The washed rings were subjected to three-stage oxidation treatment under the conditions listed in Table 1, whereby a catalyst carrier was prepared.

Table 1

| | Atmosphere | Temp. (°C.) | Time (hr.) |
| --- | --- | --- | --- |
| 1st Stage | $O_2$ (2 vol. %) + $N_2$ (balance) | 100 | 1 |
| 2nd Stage | $O_2$ (10 vol. %) + $N_2$ (balance) | 200 | 1 |
| 3rd Stage | Air | 300 | 1 |

Separately, 200 ml of aqueous solution of $H_2PtCl_6$ (0.59% by weight, calculated as Pt) was prepared, to which 10 moles/liter NaOH aqueous solution was added dropwise with stirring to adjust the pH of the $H_2PtCl_6$ solution to 9.5. The pH was measured with use of pH test paper. The solution thus adjusted was found free of any precipitation when allowed to stand for one day.

The catalyst carrier prepared as above was immersed in the solution at room temperature for 30 minutes. The solution used for the immersion treatment was thereafter checked for the presence of iron by qualitative analysis, whereby it was confirmed that no iron had dissolved out from the carrier into the solution. Finally, the carrier withdrawn from the solution was dried at 110° C. for 3 hours. The resulting catalyst contained 0.01% by weight of platinum.

COMPARISON EXAMPLE

The same procedure as in Example was repeated except that 200 ml of $H_2PtCl_6$ aqueous solution (0.59% by weight, calculated as Pt) was used for the immersion treatment without being adjusted to weak alkalinity. This aqueous solution had a pH of 2. During the immersion treatment, the solution gave off a small amount of bubbles. When subjected to qualitative analysis for the presence of iron, the solution used for the immersion treatment was found to contain iron dissolving out from the carrier. The resulting catalyst contained 0.01% by weight of platinum, i.e. the same Pt content as in the case of the Example.

ACTIVITY TEST

The catalysts obtained in the Example and Comparison Example were tested for activity on the oxidation decomposition of $NH_3$ and on the oxidation of CO.

Figure 2:
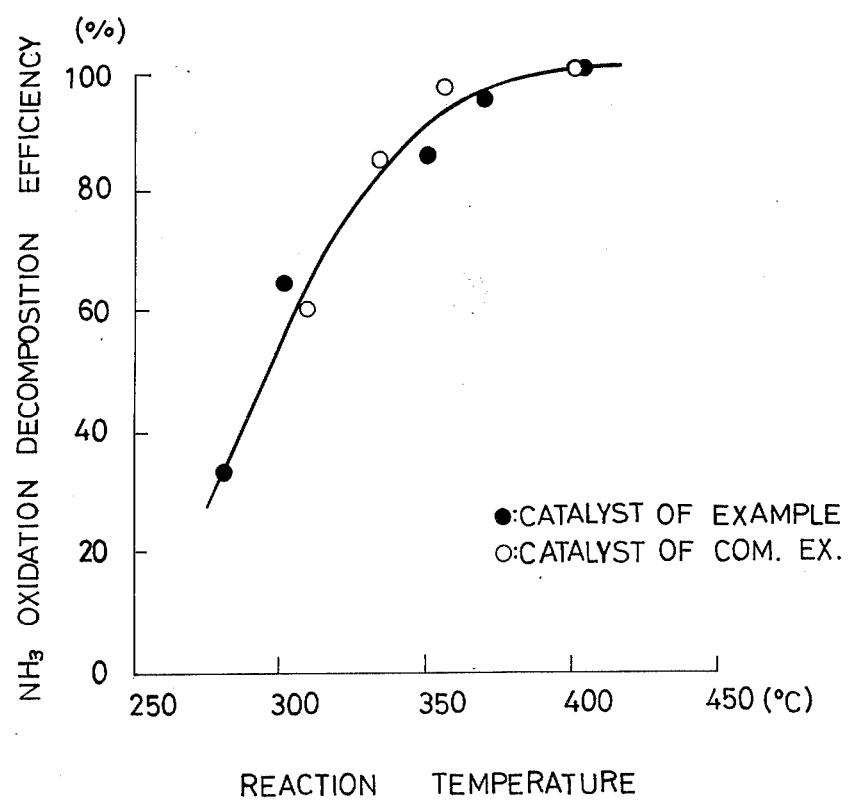
FIG. 2 is a graph showing the relationship between the reaction temperature and the $NH_3$ oxidation decomposition efficiency.

A piece of the catalyst obtained in the Example was placed in a quartz reactor tube, 30 mm in inside diameter. A simulated gas for $NH_3$ oxidation decomposition testing of the composition given in Table 2 was passed through the reactor tube at a rate of 1.2 liters/min. (S.T.P.) based on a dry state, while the reaction temperature was being controlled to a specified level by an annular electric over surrounding the reactor tube. (The gas will be referred to as "Test Gas A" below). $NH_3$ oxidation decomposition efficiencies were determined from the $NH_3$ concentrations measured at the inlet and outlet of the reactor at varying reaction temperatures. The same procedure as above was repeated for the catalyst obtained in Comparison Example to determine the $NH_3$ oxidation decomposition efficiencies thereof. FIG. 2 shows the results.

Figure 3:
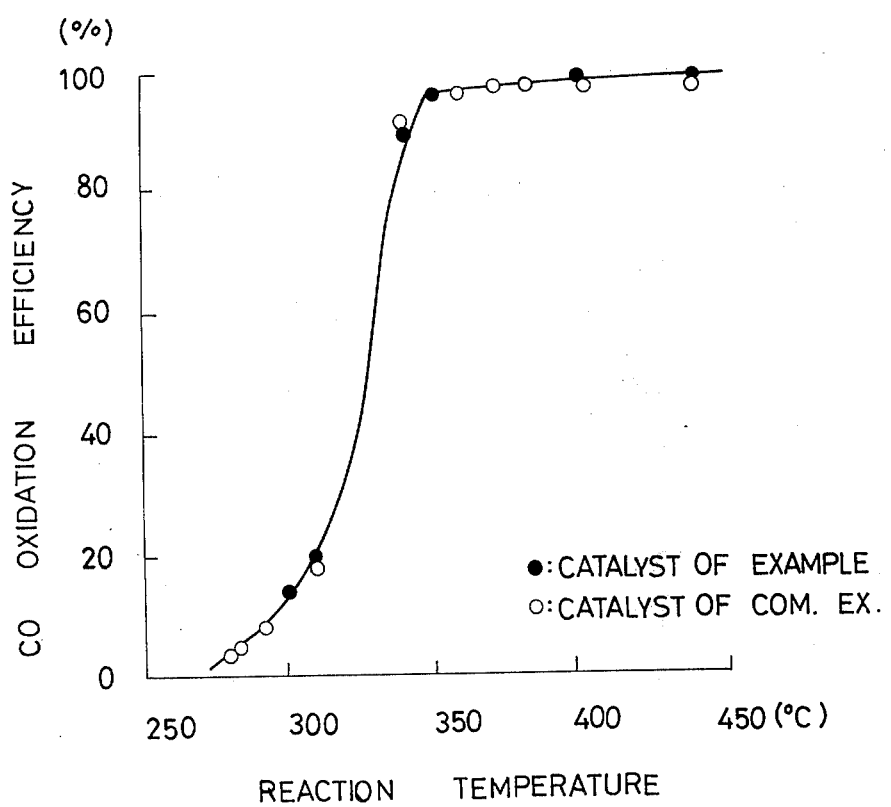
FIG. 3 is a graph showing the relationship between the reaction temperature and percent CO oxidation.

The same procedure as above was repeated for the catalysts obtained in Example and Comparison Example with use of simulated gas for CO oxidation testing (to be referred to as "Test Gas B") in place of Test Gas A to determine CO oxidation efficiency in each case. FIG. 3 shows the results.

Table 2

| | Test Gas A (vol. %) | Test Gas B (vol. %) |
| --- | --- | --- |
| $SO_2$ | 0.04 | 0.04 |
| $O_2$ | 5.0 | 5.0 |
| $CO_2$ | 12.0 | 12.0 |
| $H_2O$ | 10.0 | 10.0 |
| $NH_3$ | 0.05 | — |
| CO | — | 2.0 |
| $N_2$ | (Balance) | (Balance) |

The test results reveal that the catalyst of Example is as active as that of the Comparison Example in oxidizing $NH_3$ and CO. This indicates that the pH adjustment with use of NaOH produces no influence whatever on the activity of the catalyst of this invention.

What we claim is:

1. A process for producing a catalyst precursor for decomposing $NH_3$ by oxidation consisting essentially of the steps of converting the surface layer of steel material of specified shape resembling a ring, honeycomb or plate to an aluminum alloy, treating the steel material with an aluminum dissolving solution to dissolve out the aluminum and to render the surface layer porous, subjecting the resulting steel material to oxidation treatment to obtain a catalyst carrier, immersing the carrier in a solution of chloroplatinic acid adjusted to weak alkalinity with sodium hydroxide and drying the carrier after withdrawing the carrier from the solution.

2. A process as defined in claim 1 wherein the surface layer of the steel material is converted to an aluminum alloy by heat-treating an aluminum-coated steel material.

3. A process as defined in claim 1 wherein the aluminum is dissolved out by immersing the steel material having the alloy layer in the aluminum dissolving solution.

4. A process as defined in claim 1 wherein the aluminum dissolving solution is an aqueous solution of an alkali metal hydroxide.

5. A process as defined in claim 1 wherein the oxidation treatment is conducted by contacting the porous surface layer of the steel material with a gas containing 0.1 to 20.8% by volume of oxygen.

6. A process as defined in claim 1 wherein the carrier is immersed in an aqueous solution of chloroplatinic acid having a concentration of 0.01 to 1.0% by weight calculated as platinum.

7. A process as defined in claim 1 wherein the sodium hydroxide is used in the form of an aqueous solution.

8. A process as defined in claim 7 wherein the aqueous solution has a concentration of about 10 moles/liter.

9. A process as defined in claim 1 wherein the carrier is immersed in an aqueous solution of chloroplatinic acid having its pH adjusted to 8 to 9.

10. An oxidizing catalyst precursor produced by the process as defined in claim 1.

* * * * *